United States Patent
Yen

(10) Patent No.: US 8,000,204 B2
(45) Date of Patent: Aug. 16, 2011

(54) DATA PROCESSING METHOD FOR A HOLOGRAPHIC DATA STORAGE SYSTEM

(75) Inventor: Chia-Han Yen, Taipei (TW)

(73) Assignee: Lite-On It Corporation, Taipei (TW)

( * ) Notice: Subject to any disclaimer, the term of this patent is extended or adjusted under 35 U.S.C. 154(b) by 419 days.

(21) Appl. No.: 12/134,429

(22) Filed: Jun. 6, 2008

(65) Prior Publication Data

US 2008/0316895 A1 Dec. 25, 2008

(30) Foreign Application Priority Data

Jun. 19, 2007 (CN) .......................... 2007 1 0111544

(51) Int. Cl.
*G11B 7/00* (2006.01)
(52) U.S. Cl. ....................................................... 369/103
(58) Field of Classification Search .................... 369/103
See application file for complete search history.

(56) References Cited

U.S. PATENT DOCUMENTS

| 6,549,664 B1 * | 4/2003 | Daiber et al. ................. 382/232 |
| 6,697,316 B2 * | 2/2004 | Burr .............................. 369/103 |
| 2005/0134948 A1 * | 6/2005 | Waldman et al. ................. 359/3 |
| 2005/0201247 A1 * | 9/2005 | Goulanian et al. ............ 369/103 |

* cited by examiner

*Primary Examiner* — Adam R Giesy
(74) *Attorney, Agent, or Firm* — Thomas, Kayden, Horstemeyer & Risley, LLP

(57) ABSTRACT

A data processing method for a holographic data storage system includes in a writing operation, receiving a plurality of digital data groups; modulating the digital data groups to a plurality of corresponding digital matrixes, wherein each of the digital matrix comprises a digital data group and a plurality of digital redundancies; arraying the digital matrixes on a data plane to form an image information, wherein the image information has more opaque pixels than transparent pixels; and storing the image information in a storage medium; and in a reading operation, receiving the image information; transforming the image information into a plurality of analog matrixes, wherein each of the analog matrixes comprises an analog data portion and an analog redundancy portion; demodulating the analog matrixes to a plurality of corresponding analog data groups; and transforming the analog data groups into a plurality of digital data groups by using a soft decision apparatus.

10 Claims, 6 Drawing Sheets

DATA PROCESSING METHOD FOR A HOLOGRAPHIC DATA STORAGE SYSTEM

This application claims the benefit of People's Republic of China application Serial No. 200710111544.5, filed Jun. 19, 2007, the subject matter of which is incorporated herein by reference.

BACKGROUND OF THE INVENTION

1. Field of the Invention

The invention relates in general to a data processing method for a holographic data storage system, and more particularly to a data processing method adopting soft decision in demodulation.

2. Description of the Related Art

Compared to the storage technique of magnetic discs and DVD in the present market, a holographic data storage system is a new trend, which has higher capacity and transmission rate.

Referring to FIG. 1, a schematic diagram of a conventional holographic data storage system is shown. Normally, the holographic data storage system 100 is composed of a signal beam 12, data plane 14, reference beam 16, storage medium 18, data beam 22 and photo detecting apparatus 20.

In the holographic data storage system 100, a monochromatic light source, such as a laser source, is split into two beams through a splitter (not shown). One of the two beams arrives and passes the data plane 14 to form the signal beam 12 carrying image information. The other beam is used as the reference beam 16.

When the signal beam 12 and the reference beam 16 are simultaneously focused on the storage medium 18, interference fringes are formed by the signal beam 12 and the reference beam 16 on a focal point 24, which can be regarded as a grating formed on the focal point 24 of the storage medium 24. This operation is equivalent to completion of data writing.

Following that, when only the reference beam 16 arrives the storage medium 18, the data beam 22 is outputted in an original extension direction of the signal beam 12 (i.e. an emergence angle of the signal beam 12). Then, the photo detecting apparatus 20 is placed in the progressing direction of the data beam 22 to catch the image information originally located on the data plane 14. This operation is equivalent to completion of data reading.

Besides, by using a multiplexing technique, such as angle multiplexing or frequency multiplexing, the reference beams with different incident angles or frequencies can also be repeatedly recorded on the same focal point.

Generally speaking, the data plane 14 is a so-called spatial light modulator (SLM), such as a digital micro-mirror device (DMD) or liquid crystal display (LCD). Each the DMD and the LCD includes a number of display pixels arrayed in a matrix form. Each pixel on the matrix can be controlled by electric signals to be transparent or opaque according to the to-be-stored data. The transparent pixel is normally regarded as an "on" channel bit or a binary bit "1", while the opaque pixel is an "off" channel bit or a binary bit "0". That is to say, the image data of the data plane 14 is a combination of all possible states of the display pixels to be transparent or opaque. For this reason, the signal beam 12 passing the SLM carries the image information.

Furthermore, the storage medium 18 is photopolymer, and the photo detecting apparatus 20 is a charge-coupled device (CCD) or a complementary metal oxide semiconductor (CMOS). Similarly, each of the CCD and the CMOS includes a number of photo sensing units arrayed in a matrix form for receiving the image information carried by the data beam 22.

However, due to optical characteristics, the opaque pixels will be interfered by the transparent pixels in the image information. That is to say, if the number of the transparent pixels on the data plane 14 is larger than that of the opaque pixels, when data writing, the opaque pixels in the image information will be over-interfered and result in the lower signal-to-noise ratio (SNR). As a result, when data reading, the photo detecting apparatus 20 will receive incorrect image information and produce data reading errors.

Therefore, the conventional holographic data storage system needs to modulate the received raw data, that is, to add channel bits into the raw data, for reducing the number of the transparent pixels in the image information. In this way, the opaque pixels can be prevented from being over-interfered by the transparent pixels and the SNR can be effectively improved. The demodulation process in the data reading operation will become smoother and the error rate of data reading can thus be reduced.

The U.S. Pat. No. 6,549,664 discloses a data processing method. Although this data processing method improves the issues of too many transparent pixels by using an encoding lookup table, quite a few data reading errors are still be generated owing to adopting hard decision in the reading process.

Based on the hard decision, the analog signal with data and noise mixed together is directly determined to be a digital signal after the photo detecting apparatus 20 receives optical signals, which causes partial data to be removed together with the noise and thus increases the error rate of data reading.

SUMMARY OF THE INVENTION

The invention is directed to a data processing method for a holographic data storage system. Not only the number of opaque pixels is increased to improve the SNR, but also a soft decision is adopted in data reading to largely reduce the data error rate.

According to the present invention, a data processing method for a holographic data storage system is provided. The method includes the steps of in a writing operation, receiving a plurality of digital data groups; modulating the digital data groups to a plurality of corresponding digital matrixes, wherein each of the digital matrix comprises a digital data group and a plurality of digital redundancies; arraying the digital matrixes on a data plane to form an image information, wherein the image information has more opaque pixels than transparent pixels; and storing the image information in a storage medium; and in a reading operation, receiving the image information; transforming the image information into a plurality of analog matrixes, wherein each of the analog matrixes comprises an analog data portion and an analog redundancy portion; demodulating the analog matrixes to a plurality of corresponding analog data groups; and transforming the analog data groups into a plurality of digital data groups by using a soft decision apparatus.

The invention will become apparent from the following detailed description of the preferred but non-limiting embodiments. The following description is made with reference to the accompanying drawings.

DETAILED DESCRIPTION OF THE INVENTION

Figure 1:
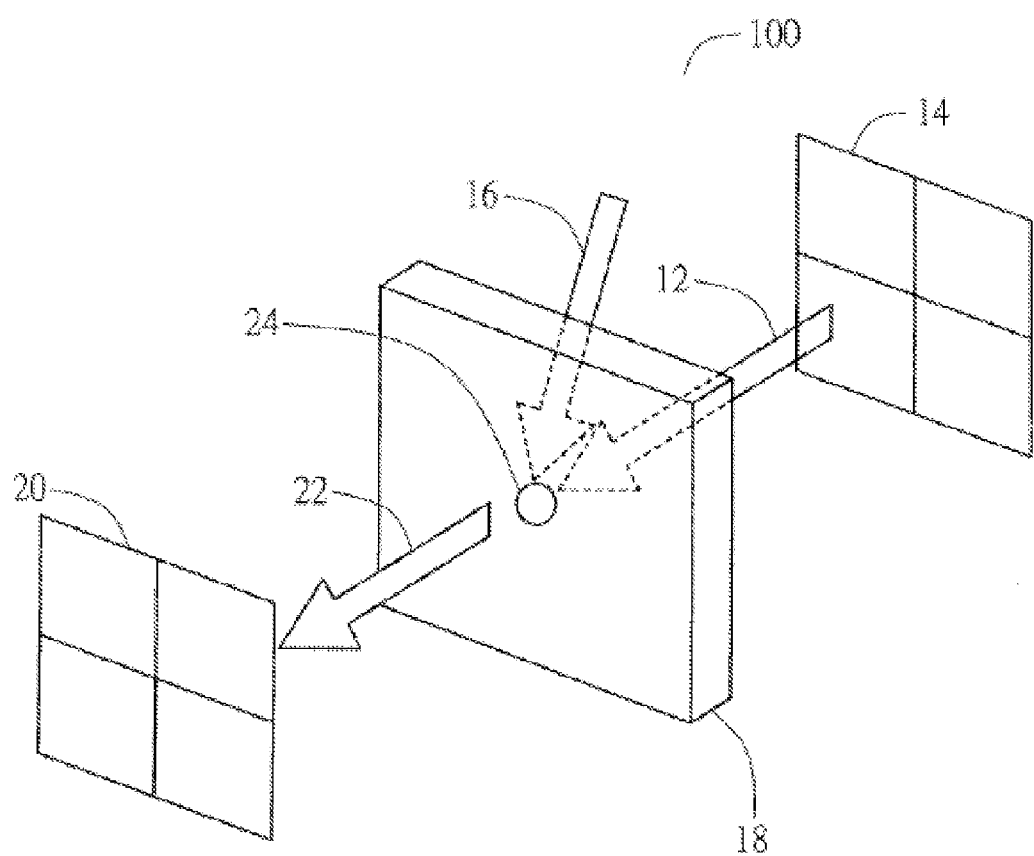
FIG. 1 is a schematic diagram of a conventional holographic data storage system.
Figure 2:
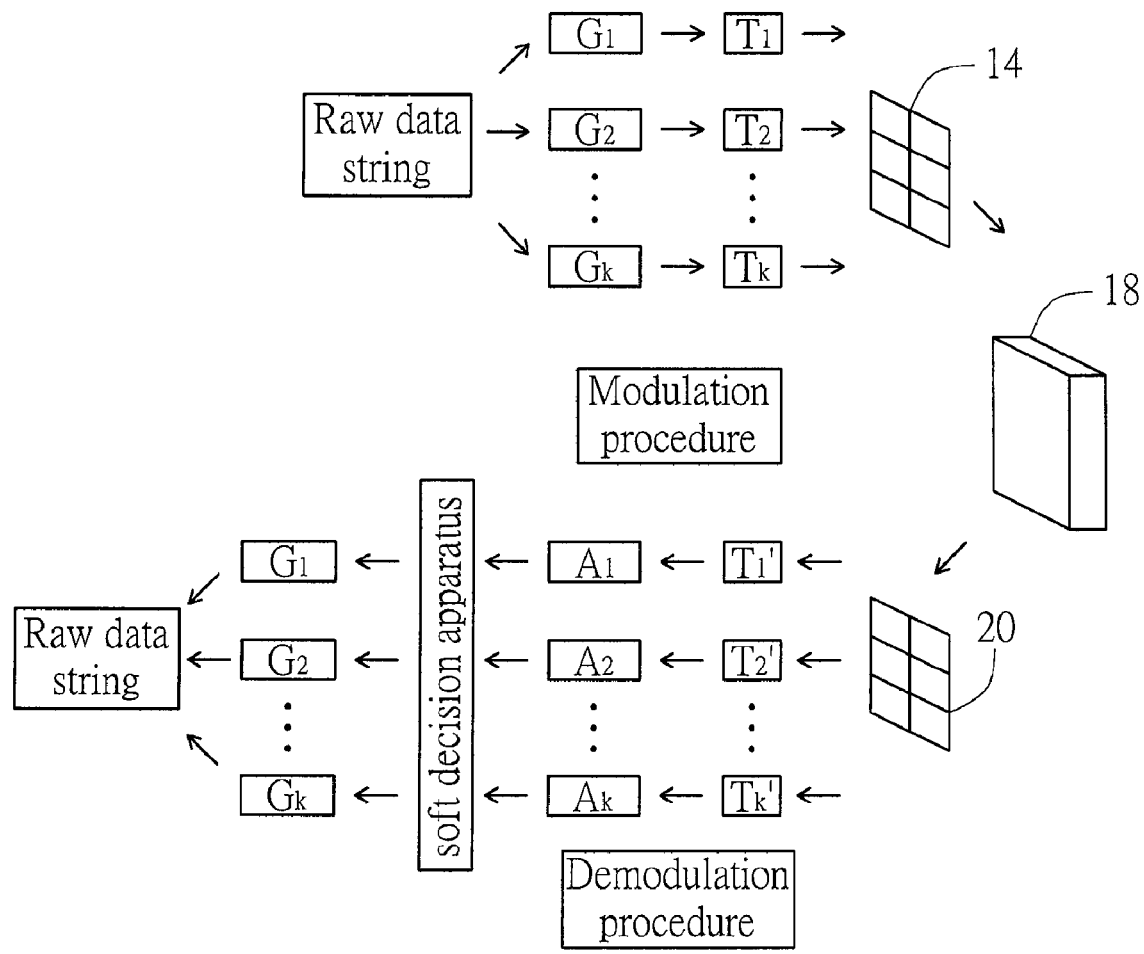
FIG. 2 is a schematic procedure diagram of a data processing method for a holographic data storage system according to the invention.

Referring to FIG. 2, a schematic procedure diagram of a data processing method for a holographic data storage system according to the invention is shown. When the holographic data storage system receives a raw data string transmitted from a host, a control circuit (not shown) of the holographic data storage system divides the raw data string into digital data groups G1~Gk, then adds redundancies into the digital data groups G1~Gk, and arrays the digital data groups G1~Gk in a specific order to form digital matrixes T1~Tk. Following that, the k digital matrixes are arranged on the data plane 14 in order, and transformed into image information by electric signals, wherein the image information has more opaque pixels than transparent pixels. Finally, the image information is stored in the storage medium 18.

A modulation procedure of the invention is the process of adding the redundancies into the digital data groups G1~Gk and forming the digital matrixes T1~Tk in the specific order. The redundancies are digital signals and represented by opaque pixels on the data plane 14.

When the photo detecting apparatus 20 of the holographic data storage system receives the image information from the storage medium 18, the control circuit (not shown) of the holographic data storage system arranges the content of the image information into analog matrixes T1'~Tk'. Following that, an analog data portion and an analog redundancy portion are obtained from each of the analog matrixes and a mathematical operation is performed on the corresponding analog data portion and analog redundancy portion to obtain analog data groups A1~Ak. In the mathematical operation, a weight of the analog redundancy portion is modulated to estimate a noise value, and then the difference between the corresponding analog data portion and the noise value is obtained. Afterwards, the analog data groups A1~Ak are transformed back to the digital data groups G1~Gk by using a soft decision apparatus. Finally, the original raw data string can be obtained by combining the digital data groups G1~Gk.

The demodulation procedure of the invention is the process of obtaining the analog data portion and analog redundancy portion from each of the analog matrixes T1'~Tk' and performing a mathematical operation on the analog data portion and analog redundancy portion to obtain the analog data groups A1'Ak. The mathematical operation is to modulate the weight of the analog redundancy portion and estimate the noise value to obtain the difference between the corresponding analog data portion and the noise value.

Figure 3:
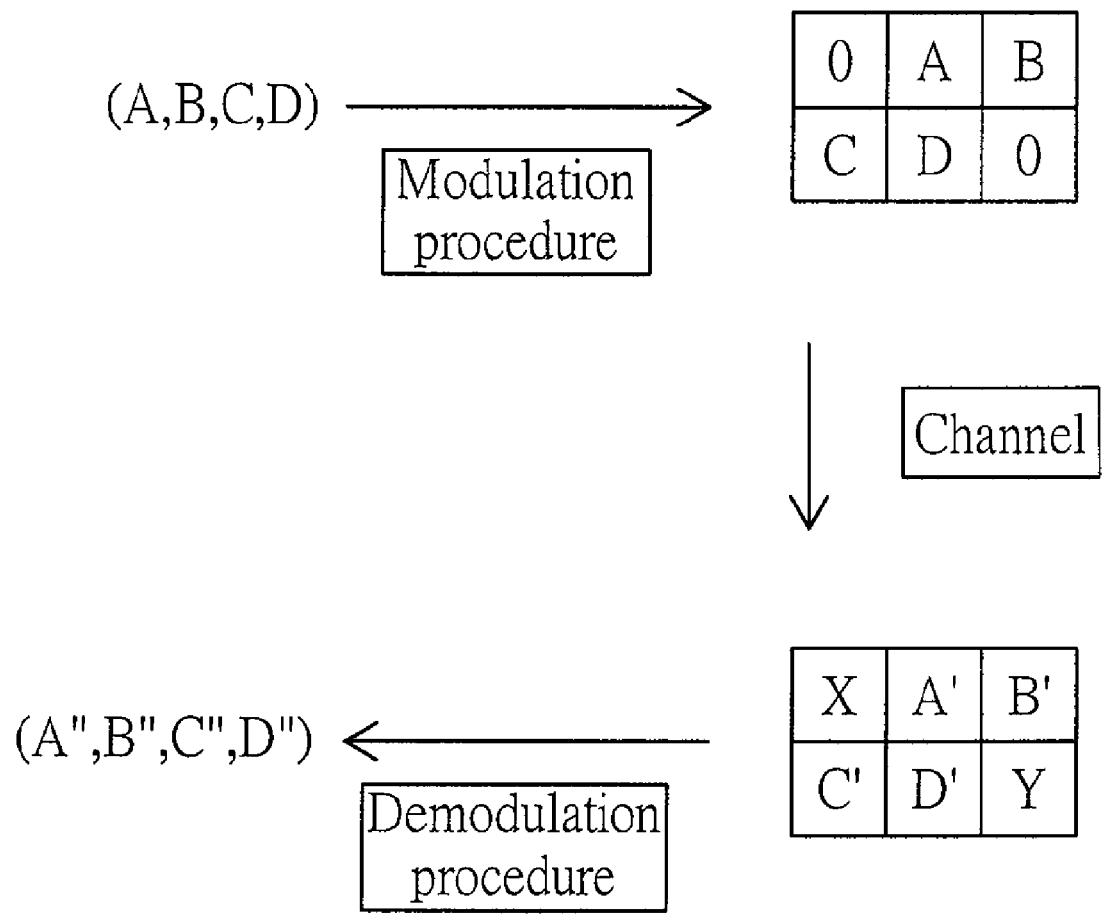
FIG. 3 is an exemplified diagram of the modulation and demodulation procedures in the holographic data storage system of the invention.

Referring to FIG. 3, an exemplified diagram of the modulation and demodulation procedures in the holographic data storage system of the invention is shown. In the example, it is supposed that a digital data group has four bits (A, B, C, D), and the bit "0" is represented by an opaque pixel on the data plane. Thus, the redundancies added in the digital data group are two bits "0". Then, totally six bits are arrayed into a 2×3 digital matrix in a specific order.

After transformed by electric signals and interfered by noise in channels, the original digital matrix becomes an analog matrix represented by voltage values. The analog matrix includes an analog data portion (A', B', C', D') and an analog redundancy portion (X, Y). Following that, an analog data group (A", B", C", D") is obtained by using the following equation:

$$A''=A'-(X+Y)/20,$$

$$B''=B'-(X+Y)/20,$$

$$C''=C'-(X+Y)/20,$$

$$D''=D'-(X+Y)/20,$$

The above equation is used to modulate the weight of the analog redundancy portion to estimate the noise value, and then obtain the difference between the analog data portion and the noise value.

Figure 4:
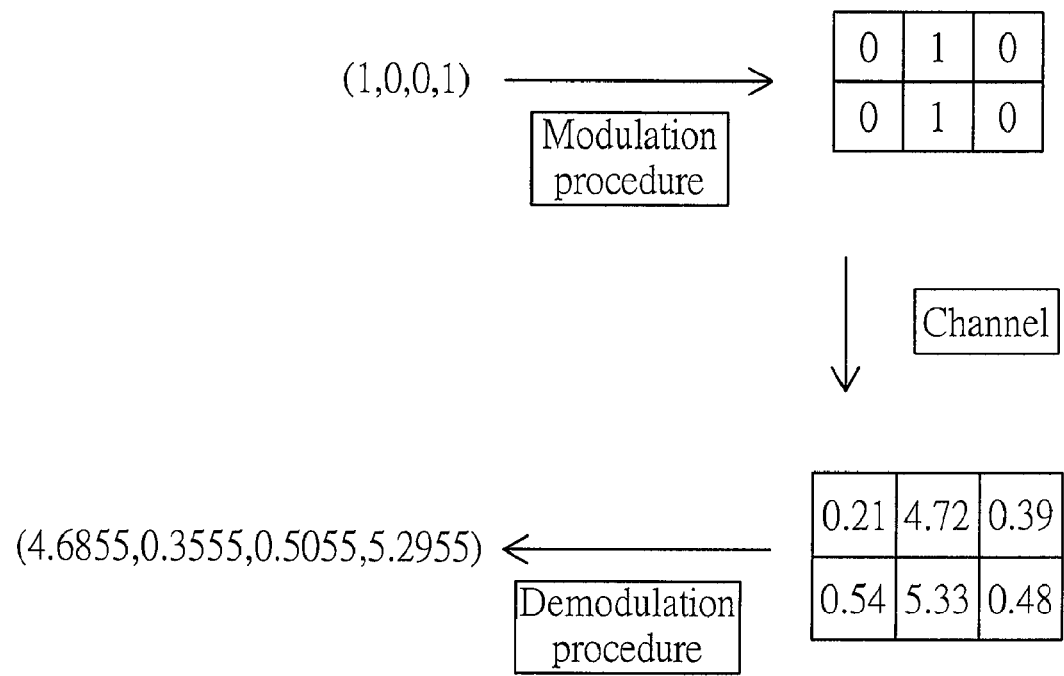
FIG. 4 is another exemplified diagram of the modulation and demodulation procedures in the holographic data storage system of the invention.

Referring to FIG. 4, another exemplified diagram of the modulation and demodulation procedures in the holographic data storage system of the invention is shown. In this example, it is further supposed that a digital data group has four bits (1, 0, 0, 1), and the bit "0" is represented by an opaque pixel on the data plane. Thus, the redundancies added in the digital data group are two bits "0". Then, totally six bits are arrayed into a 2×3 digital matrix in a specific order.

After transformed by electric signals and interfered by noise in channels, the original digital matrix becomes an analog matrix represented by voltage values. The analog matrix includes an analog data portion (4.72, 0.39, 0.54, 5.33) and an analog redundancy portion (0.21, 0.48). Following that, an analog data group (A", B", C", D") equal to (4.6855, 0.3555, 0.5055, 5.2955) is obtained by using the following equation:

$$A''=4.72-(0.21+0.48)/20,$$

$$B''=0.39-(0.21+0.48)/20,$$

$$C''=0.54-(0.21+0.48)/20,$$

$$D''=5.33-(0.21+0.48)/20,$$

The above equation is used to modulate the weight of the analog redundancy portion to estimate the noise value, and then obtain the difference between the analog data portion and the noise value.

Figure 5:
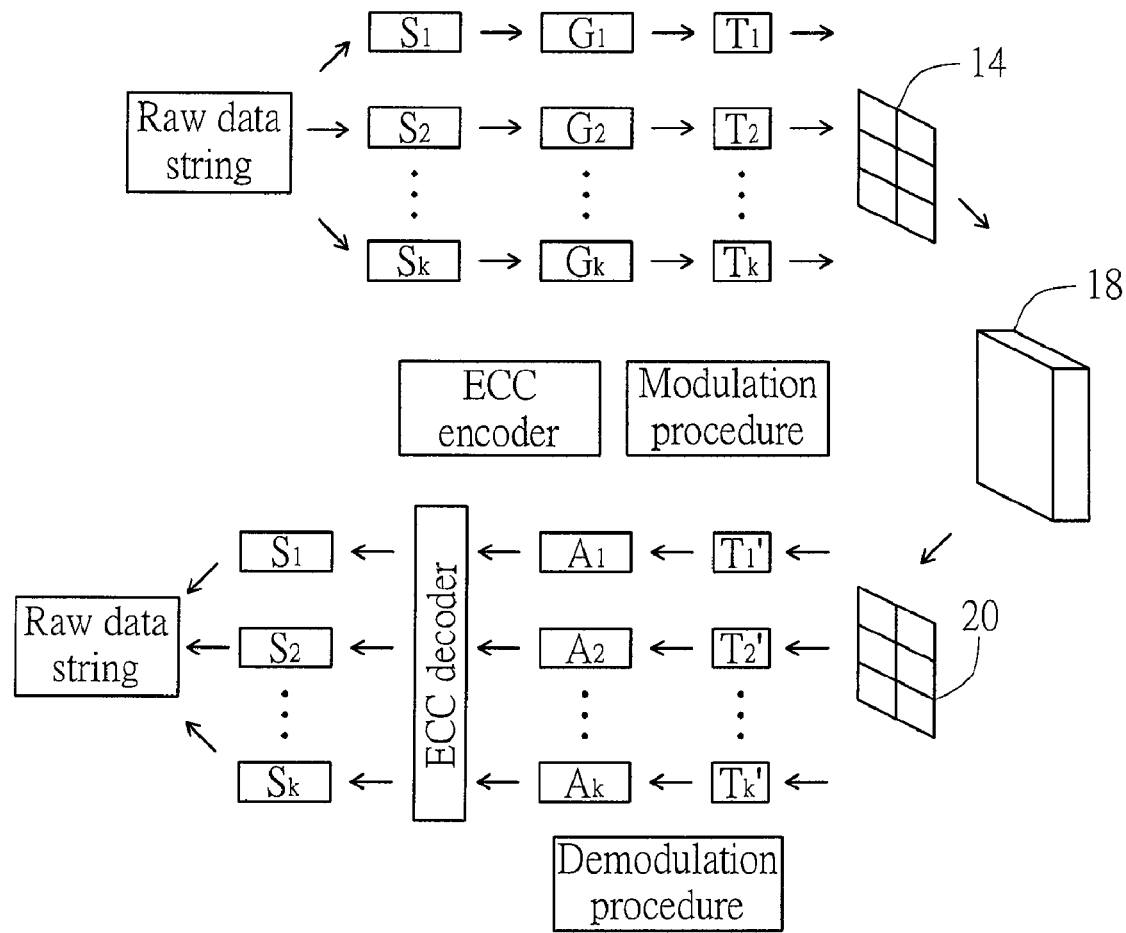
FIG. 5 is a schematic procedure diagram of a data processing method for a holographic data storage system according to another embodiment of the invention.

Referring to FIG. 5, a schematic procedure diagram of a data processing method for a holographic data storage system according to another embodiment of the invention is shown. In this embodiment, a raw data string is first divided into data sections S1~Sk. Next, the data sections S1~Sk are transformed into digital data groups G1~Gk through an error-correction-code (ECC) encoder. Following that, a modulation procedure is performed on the digital data groups G1~Gk to obtain digital matrixes T1~Tk, which are arranged on the data plane 14 in sequence to form image information. The image information has more opaque pixels than transparent pixels. Finally, the image information is stored in the storage medium 18.

When the photo detecting apparatus 20 receives the image information from the storage medium 18, the image information is divided into analog matrixes T1'~Tk'. Then, a demodulation procedure is performed on the analog matrixes T1'~Tk' to obtain analog data groups A1~Ak. Afterwards, an ECC decoder adopting soft decision is used to transform the analog data groups A1~Ak back to the digital data groups G1~Gk. Finally, the original raw data string can be obtained by combining the digital data groups G1~Gk.

Figure 6:
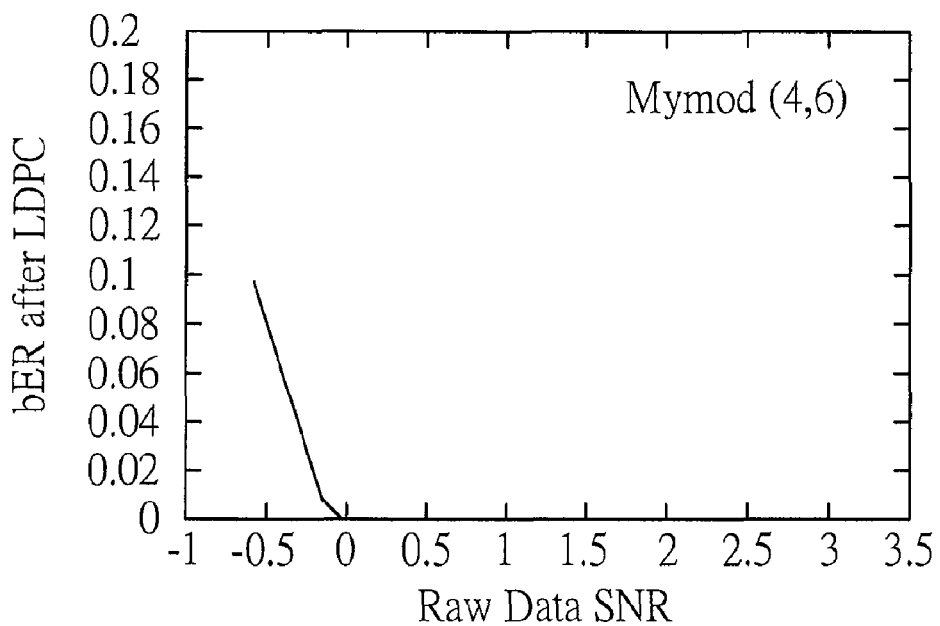
FIG. 6 is a simulation diagram of relation between the SNR and bit error rate (BER) of the raw data using a code rate of 4/6 and a low density parity check (LDPC) as an ECC according to the invention.
Figure 7:
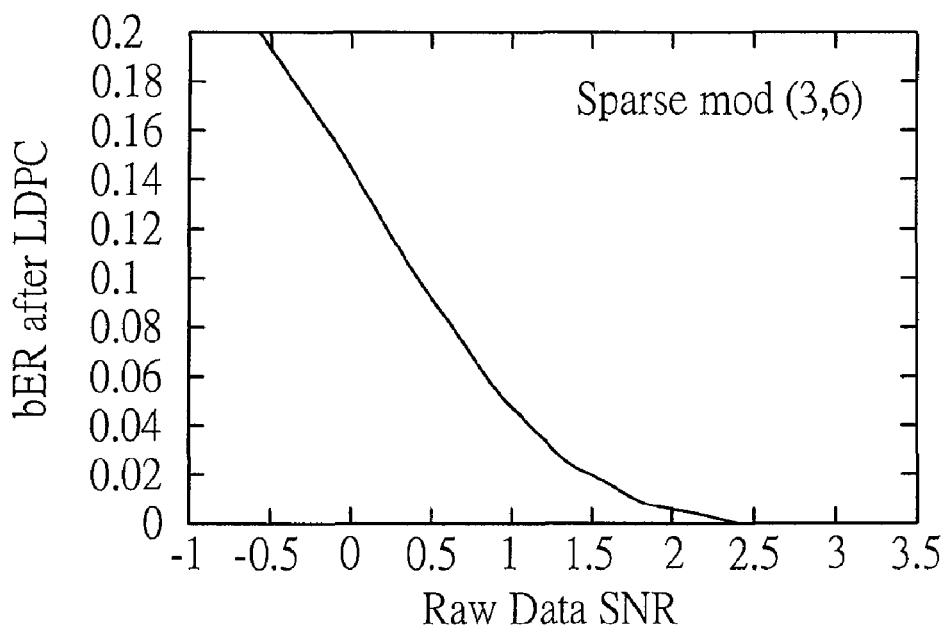
FIG. 7 is a simulation diagram of relation between the SNR and bit error rate (BER) of the raw data using a code rate of 3/6 and the same ECC as the invention in the U.S. Pat. No. 6,549,664.

Referring to FIG. 6 and FIG. 7, simulation diagrams of relation between the SNR and bit error rate (BER) of the raw data using a code rate of 4/6 and a low density parity check (LDPC) as an ECC according to the invention and using a code rate of 3/6 and the same ECC in the U.S. Pat. No. 6,549,664 are respectively shown. From the two drawings, it can be found that the invention with the code rate of 4/6 has only the SNR of 0.04 dB as the BER is reduced to approximately zero, while the U.S. Pat. No. 6,549,664 requires the SNR of 2.7 dB. In other words, the invention not only has better performance, but also requires fewer redundancies than other related technique.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing method for a holographic data storage system, comprising steps of:
   in a writing operation,
   (a) receiving a plurality of digital data groups;
   (b) modulating the digital data groups to a plurality of corresponding digital matrixes,
   wherein the modulating step includes steps of:
      (b-1) adding digital redundancies into each of the digital data groups, and
      (b-2) arraying the digital data groups with corresponding digital redundancies to form the corresponding digital matrixes;
   (c) arraying the digital matrixes on a data plane to form an image information,
   wherein the image information has more opaque pixels than transparent pixels;
   (d) storing the image information in a storage medium;
   in a reading operation,
   (e) receiving the image information;
   (f) transforming the image information into a plurality of analog matrixes, wherein each of the analog matrixes comprises an analog data portion and an analog redundancy portion;
   (g) demodulating the analog matrixes to a plurality of corresponding analog data groups; and
   (h) transforming the analog data groups back to the plurality of digital data groups by using a soft decision apparatus.

2. The data processing method according to claim 1, wherein the redundancies are represented by opaque signals on the data plane.

3. The data processing method according to claim 1, wherein the step (g) further comprises performing a mathematical operation on the analog data portion and the analog redundancy portion in each of the analog matrixes.

4. The data processing method according to claim 3, wherein the mathematical operation is performed by modulating a weight of the analog redundancy portion to estimate a noise value and then obtaining a difference between the corresponding analog data portion and the noise value.

5. The data processing method according to claim 1, wherein the data plane is a spatial light modulator (SLM).

6. The data processing method according to claim 5, wherein the SLM is a digital micro-mirror device (DMD) or a liquid crystal display (LCD).

7. The data processing method according to claim 1, wherein in the reading operation, the image information is received by a photo detecting apparatus from a storage medium.

8. The data processing method according to claim 7, wherein the photo detecting apparatus is a charge-coupled device (CCD) or a complementary metal oxide semiconductor (CMOS).

9. The data processing method according to claim 1, further comprising steps of:
   (a-1) dividing a raw data string into a plurality of data sections; and
   (a-2) transforming the plurality of data sections into a plurality of digital data groups by using an error-correction-code (ECC) encoder.

10. The data processing method according to claim 9, wherein the soft decision apparatus is an ECC decoder having a soft decision function.

\* \* \* \* \*